Dec. 10, 1946.　　V. E. PRATT ET AL　　2,412,551
FILM FEEDING DEVICE
Filed June 10, 1944　　2 Sheets-Sheet 1

VERNEUR E. PRATT
& GEORGE F. GRAY  INVENTORS

BY
Van Deventer & Greer
Attorneys

Patented Dec. 10, 1946

2,412,551

UNITED STATES PATENT OFFICE 2,412,551

FILM FEEDING DEVICE

Verneur E. Pratt and George F. Gray, Norwalk, Conn.

Application June 10, 1944, Serial No. 539,740

7 Claims. (Cl. 88—28)

In scanning devices, often termed reading machines as commonly used with microfilm, a pair of winding members usually termed the delivery and take-up reels are used to hold the film in the machine as it is fed past the lens system. The film is wound off a delivery reel on to a take-up reel, and then rewound.

When these reels are motor driven they are usually driven by belts and pulleys with some mechanical shifting arrangement to shift the power drive from one reel to the other, depending upon whether the film is being translated, i. e.—moved from delivery to take-up, or rewound, i. e.—wound back on to the delivery reel.

In some cases two motors are used, one for each reel, with some provision to mechanically disconnect the motor not used, and thereby free the reel from which the film is being taken. In most cases, whether one or two motors are used, some braking mechanism is necessary and is used to control the reels so that the film will not unwind too quickly from the reel from which it is being taken. As during such unreeling the diameter of the roll of film continuously decreases, uniform mechanical braking is difficult and in many devices is unsatisfactory as it results in the piling up of the film, breakage and scratching. This is particularly true with imperforate film commonly used with microfilm readers.

The present invention relates to a film feeding device in which the foregoing objectionable features are eliminated, the apparatus simplified and smooth performance obtained with a minimum of parts easily constructed and assembled.

These are the objects of the invention, and others will be apparent from the following specification where three forms of the device are shown. It will be understood, however, that the invention may be embodied in many other forms of apparatus once the inventive concept herein disclosed is understood. The invention is therefore as defined in the appended claims. What is shown here is merely by way of illustration.

Figure 4:
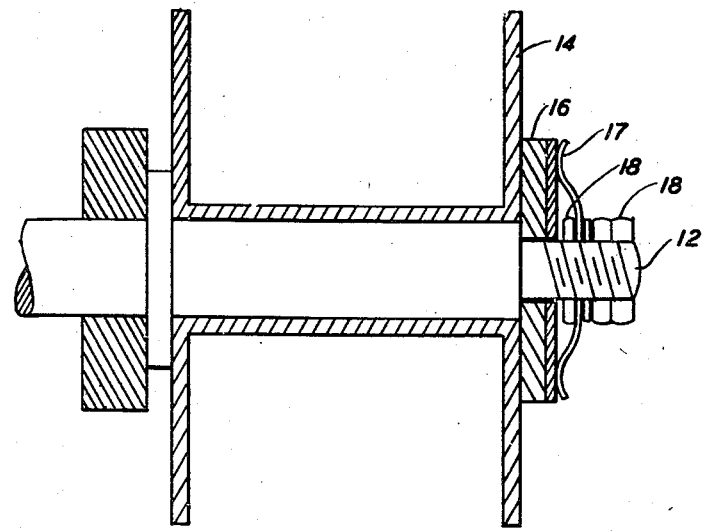
Figure 4 is a sectional view of one of the reels, Fig. 1.
Figure 1:
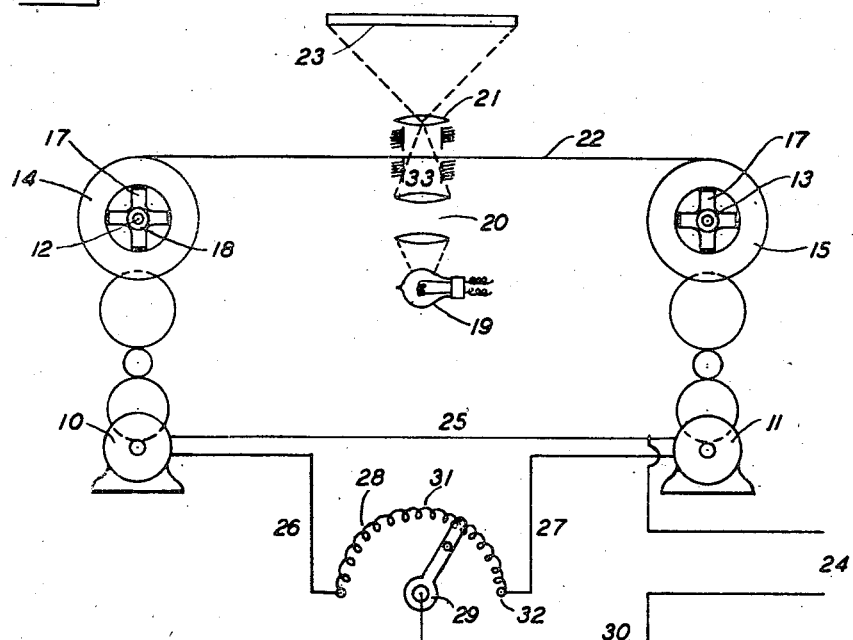
Figure 1 is a diagram illustrating the invention as applied to the reels of a reading machine.

Referring to Figure 1, the motors 10, 11, are of any suitable type and may have gear reducers built in or associated therewith as shown to drive the reel shafts 12, 13, at the desired speed.

Each motor shaft supports a winding member or film reel 14, 15 and the reels are driven by their shafts through a suitable friction device, such as the pad 16, pressed against the reel by spring 17 which is secured to the shaft so as to rotate therewith. Spring 17 may be adjusted by nuts 18. Both reels have the same form of friction device which is not operative to let the reel slip during normal operation of the device, but permits slippage should abnormal tension develop in the film.

Reel 14 may be considered as the delivery reel which is filled with film and put in the machine, and from which the film is wound off and on to the take-up reel 15.

Figure 2:
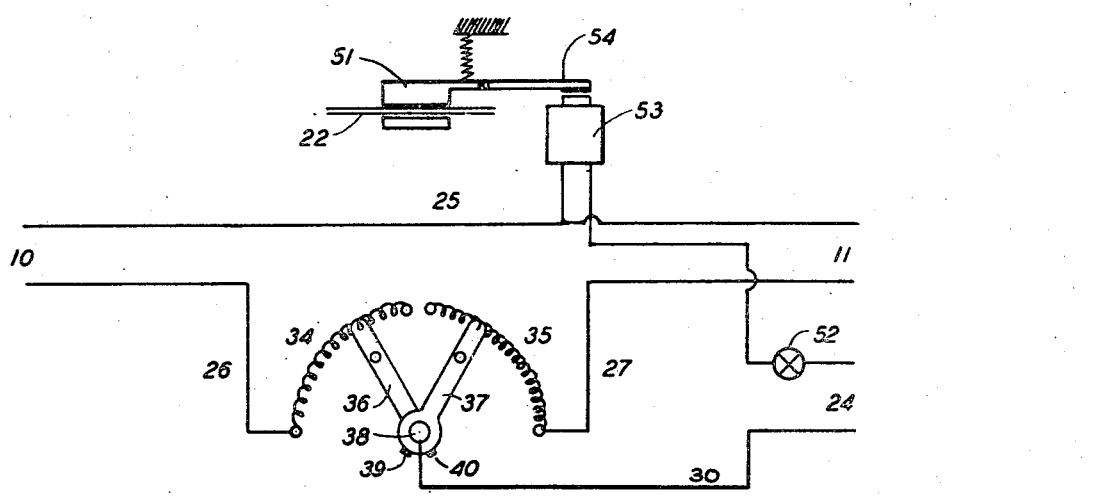
Figure 2 is a diagram of a modified form of the invention.

In the path of travel of the film from one reel to the other is located the usual light source 19 and lenses 20, 21, all as shown in Figure 2, 22 being the film. The lenses, light source, viewing screen 23 and other parts common to readers are not here described, as any suitable parts may be used. The present invention is concerned only with the operation of the reels and the motor drives therefor.

A current supply circuit 24 has a conductor 25 connected to motors 10, 11 which are connected to run in opposite directions. These motors connect to a resistance or inductance 28 having a contact arm 29 connected to conductor 30 of the supply circuit. The resistance 28 is of such characteristics that when the arm 29 is at the midpoint 31 thereon, both motors will receive equal amounts of current and therefore will be operating at substantially the same speeds and torque, the latter varying slightly dependent upon the difference in the load on the reels 14, 15.

Now, by varying the position of contact arm 29, either motor can be made to overcome the other. For example, if arm 29 is moved to the point 32, the motor 11 will be directly across the current supply 24 with none of the resistance 28 in circuit, and all of this resistance will be in circuit with motor 10. The result will be that motor 11 will drive the reel 15 to take film from reel 14, motor 10 acting as a brake on 14 and thereby keeping the film tight in the lens opening or film gate 33.

In Figure 2 is shown a modification of the control shown in Figure 1. Here the resistance or inductance is split as shown at 34, 35. Two arms 36, 37 are mounted to revolve about shaft 38 and may be individually set to effect the necessary operating conditions. All connections are as shown in Figure 1.

If desired, the arms 36, 37 can be set to effect some desired set differential control by securing them in the desired relative position to shaft 38 as by screws 39, 40, in which event the shaft turns with the arms. Moving either arm will then move the other.

Figure 3:
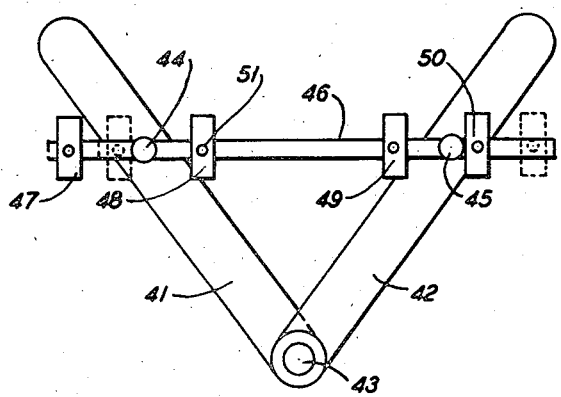
Figure 3 is a diagram of a modified form of controller arm.

In Figure 3 is shown a further modification of the control device. Here the arms 41, 42 are independently movable about shaft 43 and are provided with the lugs 44, 45 which are fixed to the arms but free to revolve thereon. A rod 46 passes through holes in the lugs as shown and carries the collars 47, 48, 49, 50 which are slidable along the rod and may be secured thereto by screws, one of which is shown at 51. By setting the collars, any desired adjustment of the differential may be obtained in order to compensate for the conditions due to the varying diameters of the rolls of film when being wound in either direction.

For example, when translating, if arm 42 is moved to the right to give the motor 11 full torque it would finally rest at 32 Figure 1, and collar 50 would be adjusted to engage lug 45 at some desired point in this travel to the right. This would move rod 46 to the right, and by adjusting collar 47 thereon, arm 41 would be moved clockwise the desired distance to increase the resistance (or inductance) in circuit with motor 10 in any desired relation to the decrease in resistance in circuit with motor 11.

Conversely, by adjusting collars 48 and 49 the resistance in series with motor 11 can be increased, as the resistance in series with motor 10 is diminished. Thus motor 10 will have the greater torque and motor 11 the lesser, and film will be wound off reel 15 and on to reel 14 while held taut in the gate 33.

Should the film catch, or anything happen where the pull on the film in either direction exceeds the tension of the driving friction clutches (16, 17 on each reel) a clutch will slip and thereby prevent tearing the film. It will be understood that at all other times the clutches maintain a positive drive between the motors and the reels, and play no part in the normal braking operation, unlike many clutches in the prior art. Here, the braking action as described is entirely due to the difference in torque of the two motors, both of which operate simultaneously in opposite directions to maintain the film at the desired degree of tension between the reels. When one motor is operating to wind, the other acts as a brake on the film.

While for the sake of illustration the invention is disclosed as applied to a film winding apparatus, it will be apparent to those skilled in the art that it can be advantageously applied to many devices wherein it is desired to wind webs while holding same under tension.

In Figure 2 is disclosed an arrangement which can be used with the circuits herein described to lift the film gate 51 or any other device in contact with the web or film between the reels. Here when the switch 52 in the current supply mains 24 is operated, as for example when the circuit through the motors 10, 11 is closed, the electromagnet 53 operates to attract armature 54 attached to the movable member of the film gate 52 which is opened, thereby relieving the film when same is in movement in either direction. The magnet 53 may be "quick" opening and slow closing to give the film opportunity to stop moving before 51 closes. Magnet 53 can be bridged across conductors 25 and 30 instead of being in series with 25, as shown.

When used with alternating current, the motors 10, 11 might be either of the shaped-pole type or series commutating type in order that the resistances, such as 31, may be effective. And it will be understood that, instead of resistances herein described by way of illustration, any suitable controlling device can be used that will vary the torque of the motors to produce the result herein described.

It will also be observed that if the motors used have limited torque, the friction devices, such as the pad 16, associated with each reel may be omitted and that instead of driving the shafts 12 for the reels, the reels themselves may be directly driven from the motor gearing or in any other suitable manner.

What is claimed is:

1. In a film feeding device having a lens, a film reel, a shaft therefor, a motor connected to said shaft to drive same in one direction, a second film reel, a shaft therefor, a motor connected to said second shaft to drive same in the opposite direction to said first reel, a film connecting said reels and adapted to be wound from one reel to the other, a friction clutch between each reel and its associated shaft, a fixed film support mounted on said device and fixed in the optical path of the lens thereof, a current supply circuit connecting said motors, and means in said circuit for varying the torque of said motors whereby when one of said motors is winding said film on one of said reels the other motor is acting as a brake on the reel from which the film is being wound whereby said film is tensioned across said support as it traverses same.

2. In a device of the character described, a lens, a film, a film gate having a movable gate member adapted to engage and hold said film in a predetermined relationship to said lens, a pair of reels and a film extending therebetween and at right angles to the axis of said lens, motors for driving said reels connected thereto and adapted to drive said reels in opposite directions and constituting the sole means for moving said film in both directions, a circuit connected to said motors to simultaneously operate the same, means in said circuit for varying the torque of said motors whereby when one motor is moving said film across the axis of said lens the other motor is acting as a brake to tension said film between said reels, and means in said circuit and operable with said motors therein for automatically releasing said gate member to release the film held thereby.

3. In a film feeding machine, winding members, separate independent motor means for simultaneously operating said members to wind in opposite directions, a film between said members to be moved thereby, means including a movable film gate engaging said film between said reels, means for utilizing one of said motor means as a brake on the movement of said film, a circuit including a source of current connected to said motors, and means included in said circuit and operable by current flowing therein for releasing said movable film gate while either of said motor means is in operation in either direction.

4. In a film feeding device of the class described, a film and rotatable means for moving same, a pair of motors connected to said moving means and adapted to move same in either direction, a circuit common to said motors, means connected to said circuit for simultaneously varying the torque of said motors whereby the torque of one may exceed the other to tension said film being moved thereby, and means for gripping said film when same is at rest, and for releasing same whenever said motors are moving same in either direction, said means including an electromagnet connected to said circuit.

5. In a film feeding device having a lens, a pair of shafts supported on said device, a fixed film gate in the optical path of said lens system and supported on said device in fixed relation to said shafts, individual motors supported on said device and separately connected to said shafts to drive same in opposite directions, means driven by said shafts for winding a film from one location on said device to another location thereon with said film gate therebetween, and means for varying the torque of said motors when both are rotating, whereby a film passing through said gate may be wound by one of said motors and tensioned by the other motor while said gate remains fixed in the optical path of said lens.

6. In a film feeding device having a lens, a pair of shafts supported on said device, a fixed film gate in the optical path of said lens system and supported on said device in fixed relation to said shafts, individual motors supported on said device and separately connected to said shafts to drive same in opposite directions, means including detachable film reels driven by said shafts for winding a film from one location on said device to another location thereon with said film gate therebetween, and means varying the torque of said motors when both are rotating whereby a film passing through said gate may be wound by one of said motors and tensioned by the other motor while said gate remains fixed in the optical path of said lens.

7. The combination as claimed in claim 6 wherein each of said reels is connected to its rotating shaft by an independently adjustable clutch, whereby each reel may be independently adjusted to permit slippage when the tension on a film extending between said reels exceeds a predetermined limit.

VERNEUR E. PRATT.
GEORGE F. GRAY.